No. 879,515.

PATENTED FEB. 18, 1908.

J. H. CAMPBELL.
APPARATUS FOR CONCENTRATING LIQUIDS.
APPLICATION FILED FEB. 6, 1901.

2 SHEETS—SHEET 1.

WITNESSES:
Dominig A. Usina
Fred White

INVENTOR:
Joseph H. Campbell,
By Attorneys,
Arthur C. Fraser

No. 879,515. PATENTED FEB. 18, 1908.
J. H. CAMPBELL.
APPARATUS FOR CONCENTRATING LIQUIDS.
APPLICATION FILED FEB. 6, 1901.

2 SHEETS—SHEET 2.

WITNESSES:
INVENTOR:
Joseph H. Campbell,
By Attorneys, even# UNITED STATES PATENT OFFICE.

JOSEPH H. CAMPBELL, OF NEW YORK, N. Y., ASSIGNOR, BY MESNE ASSIGNMENTS, TO CHARLES H. CAMPBELL AND TO ELIZABETH AND CHARLES H. CAMPBELL, EXECUTORS OF SAID JOSEPH H. CAMPBELL, DECEASED.

APPARATUS FOR CONCENTRATING LIQUIDS.

No. 879,515. Specification of Letters Patent. Patented Feb. 18, 1908.

Application filed February 6, 1901. Serial No. 46,225.

*To all whom it may concern:*

Be it known that I, JOSEPH H. CAMPBELL, a citizen of the United States, residing in the city, county, and State of New York, have invented certain new and useful Improvements in Apparatus for Concentrating Liquids, of which the following is a specification.

My invention aims to provide an improved apparatus for concentrating liquids, and which is especially adapted for concentrating liquids which require to be concentrated rapidly, but which would be injured by the employment of a high temperature.

My invention aims also to provide an improved apparatus which is especially adapted for concentrating liquids which have a tendency to foam when agitated.

My invention introduces also various other improvements in operation and in details of construction, as will be hereinafter more fully specified.

Figure 1:
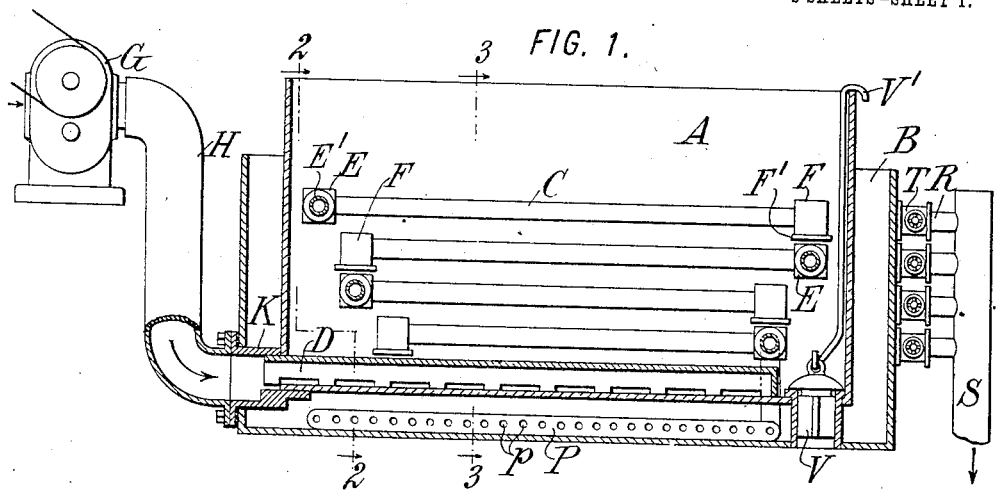
Figure 2:
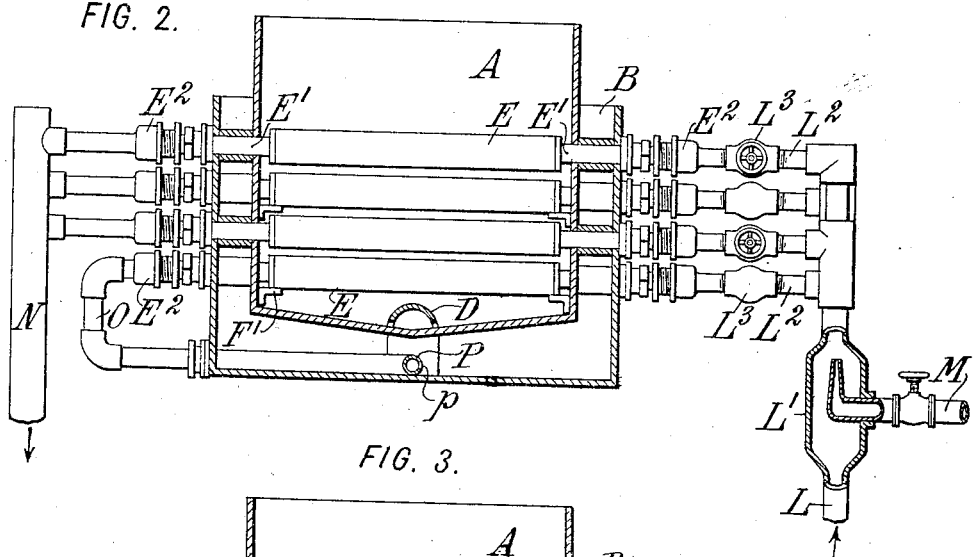
Figure 3:
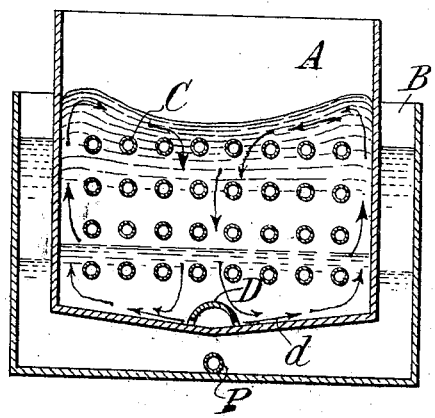
Figure 4:
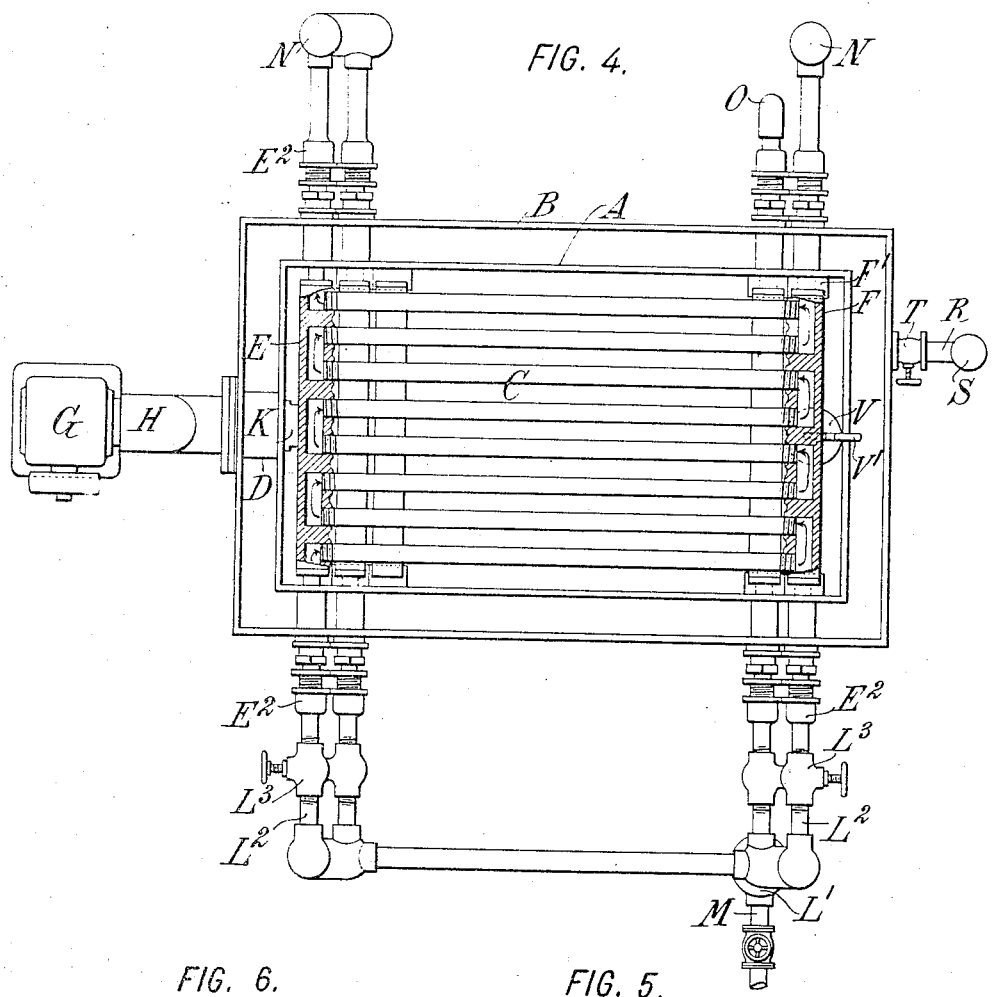
Figures 5, 6:
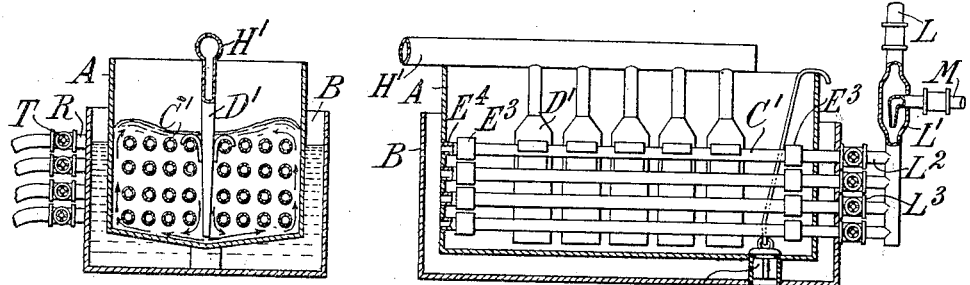

Referring to the accompanying drawings showing certain embodiments of my invention, Figure 1 is a central longitudinal section; Fig. 2 is a cross-section on the line 2—2 of Fig. 1; Fig. 3 is a section on the line 3—3 of Fig. 1, omitting all parts which would appear in elevation, and illustrating especially the operation of the apparatus; Fig. 4 is a plan partly in section; Figs. 5 and 6 are a longitudinal and a cross section respectively of a modification, a somewhat smaller scale being used.

My complete apparatus as illustrated comprises a tank for the liquid; means for heating the mass of liquid, which may be a chamber such as a jacket or a series of internal coils, or preferably both, the walls of which are in contact with the liquid and through which a heating medium such for example as hot water or steam is circulated; and means for introducing air in large volumes into the liquid to carry off the heated vapor, whereby the liquid may be concentrated rapidly and at a low temperature.

In the preferred arrangement of my apparatus, which is especially designed for the reduction of liquids, such for example as milk, which have a tendency to foam and thus retard the escape of the vapor with the injected air, the air is introduced into the liquid in large quantities in the form of a broad sheet or stream and in such a direction as to set the mass in circulation with a rolling motion whereby disengagement of the air bubbles is facilitated and foaming reduced. I prefer also to arrange the parts so that the coils and walls, or other heating surfaces, are subjected to a scouring action by reason of the direction of the air blast, which prevents the formation of a deposit on said heating surfaces. I also in the preferred form of apparatus provide for maintaining the area of application of heat below the level of the liquid by the gradual lowering of the level of the heating medium in the jacket, coils or the like, as the liquid in the tank is concentrated and its level lowered. This feature is of especial usefulness with liquids which as they are splashed up would adhere to the walls above the general level and (if said walls remained hot) would become hardened thereon.

Referring to Figs. 1 to 4 of the drawings, A is a tank in which the liquid is concentrated. For heating the liquid I employ a jacket B, or coils C, or both, as shown, through which a heating medium such as steam or hot water circulates. For introducing air, I show a pipe D composed of a segment of a complete circle, which rests on the bottom of the tank and which is perforated at the sides for the escape of the air. The apertures through which the air escapes are broad, as shown in Fig. 1, so as to introduce the air in large quantities and in the form of a broad sheet or stream, rather than a number of fine jets; so that the blast of air forcibly moves the mass of liquid, rather than merely mingling with it and rising more or less directly to the surface as would be the case with fine jets. By the arrangement of internal coils and a jacket, I am enabled to heat the mass of liquid throughout, and by the use of an air pipe such as D I am enabled to introduce air in very large volume into the liquid, which carries off the heated vapor produced by reason of the extended heating surface of the walls of the jacket and coils in the tank, and while concentrating the liquid rapidly, maintains its temperature below that of the heating medium. In fact by proper proportioning of the quantity and temperature of heating medium and the quantity of air introduced, I am enabled to evaporate liquids at almost any desired temperature, and within a wide range of variation of rapidity.

A serious difficulty which is encountered in the concentration of many liquids by agitating methods, is the formation of a strong tough foam which seriously retards the escape of the vapor with the injected air introduced into the liquid, and the consequent evaporation. I have found that the escape of the air bubbles from the liquid is facilitated by giving the liquid a rolling motion. This rolling motion may be accomplished by a variety of forms of my apparatus. In the preferred form of my apparatus, the rolling motion of the mass of liquid is obtained by introducing the air through the pipe D near the bottom of the tank in broad sheets or streams as explained, and in a direction approximately along said bottom, as indicated by the arrows, $d$ in Fig. 3. The air travels along the bottom and then up the side walls of the tank, carrying the liquid with it; the air escaping at the top and the circulation of the liquid being continued downward at the center to the pipe D again. By this relative arrangement of the walls and bottom of the tank and the coils and air pipe D, the liquid or the combined air and liquid scour the exposed heating surfaces and keep them clean and bright. There is in some liquids a constant tendency to form a deposit on the walls and where these walls are heated to a higher temperature than the body of the liquid, the formation of a hard cooked cake is frequently observed. By avoiding this objectionable action, my apparatus prevents the loss of a portion of the solid (and usually more valuable) constituents, and prevents any lumpiness in the resulting product.

For the purpose of cleansing the coils, I prefer to arrange them so that they may be easily accessible after each concentrating operation. One mode of accomplishing this result is shown in Figs. 1 to 4. Each coil C is composed of a pair of headers E F, and a series of connecting pipes, the headers being arranged in a well known manner to produce a circulation forward and backward through the successive pipes. The heating medium is introduced and withdrawn at opposite ends of the header E through pipes E' which pass through the walls of the tank and jacket, and are swiveled at $E^2$. The details of these connections are not important to my invention. The alternate coils C are trunnioned at opposite ends, as shown in Fig. 1, and are offset so that each may be raised in turn to a vertical position by rotating about the center of the header E. For supporting the coils in their operative horizontal position, I provide brackets F' attached to the walls of the tank. My heating coils are thus capable of a thorough and very expeditious cleaning either during or after the operation of the apparatus. By turning the coils into a vertical position, I also provide access to the bottom and sides of the tank for cleaning the same.

My air supply pipe where entirely submerged in the liquid, as in the form shown at D in Fig. 2, or partially submerged in the liquid, may require also to be cleaned frequently, and I provide for its removal for this purpose. In the construction shown in Fig. 1, the pipe D is removable endwise through the wall of the tank and of the jacket. The air is introduced by means of a blower, such as the Root pressure blower G, through a pipe H, which is swiveled at its upper end and is removably connected at its lower end to a casting K, which conducts the air to the pipe D. The casting is preferably fixedly attached in position. For removing the pipe D, the pipe H is disconnected from the casting K and is turned aside about its upper swiveled connection, and the pipe D is then withdrawn longitudinally through the casting K. Any other construction which permits access to the pipe D for cleaning it would be suitable.

The necessary connections for causing a circulation of the heating medium through the coils and jacket may be varied infinitely. A feature of my apparatus is the arranging of the connections and valves in such a way that the supply to the various coils may be cut off as the level of the liquid falls below such coils by reason of its concentration, and that the level of the heating medium in the jacket may also be lowered to be always below the level of the liquid in the tank. This is for the purpose of maintaining the area of application of heat below the level of the liquid under treatment. The surfaces above the level of the liquid are thus kept cool, which avoids the injurious caking above referred to which would result from the splashing of the liquid on such surfaces. I also economize heat in this way, supplying only that useful for the continuation of the operation.

L is the suction pipe for an injector L', in which steam is introduced through a pipe M, whereby the water may be heated and also forced into the several branches $L^2$ which connect with the entrance end of the trunnioned headers E.

$L^3$ indicate valves for controlling the supply to each of the headers E independently. After passing through the headers E, the heating medium may then be carried to a waste pipe N, from which it runs off or is again drawn up through the suction pipe L. The jacket supply may be independent of the supply to the coils, but I find it most convenient to supply the jacket from the exhaust of the lowest header E, as shown best in Fig. 2. This lowest header E discharges through the swiveled joint $E^2$ into a pipe O, which in turn connects with a pipe P running longitudinally of the jacket. By connecting the jacket with the lowest coil which is always in operation during the concentration of the liquid, the supply to the jacket is always maintained. For lowering the level of the heating medium in the jacket, I employ a series of branches R (Fig. 1) discharging into a waste pipe S, and controlled by cocks T. The injector L and connected parts are shown as merely one example of a heating and circulating means. Any other suitable means may be employed which will effect the desired result.

In Fig. 3 the upper levels show the liquid in the tank and the heating medium in the jacket during the first part of the operation; the arrows showing the rolling motion of the liquid under the action of the injected air whereby foaming is prevented and the exposed walls of the tank and coils are scoured. As the concentration progresses the heating medium in the successive coils is cut off and the level of the same in the jacket is lowered to maintain the heating surfaces below the level of the liquid in the tank. When the desired degree of concentration is reached the air supply is discontinued and the conditions shown by the lower levels in Fig. 3 obtained. A valve V in the bottom of the tank is opened by means of an upwardly extending rod V' for emptying the tank.

My invention is capable of modification in a variety of ways, without departure from the principle of the invention, or from the mode of operation above described. For example in Figs. 5 and 6 I show a modification in the arrangement of the circulating coils, and in the means for introducing the air. The same rolling movement of the mass of liquid, and the same scouring action, are present however. The same capability of lowering the area of the heating surface is also present. In this construction the tank A and jacket B are the same as in the previously described construction. The coils C' comprise headers E³ and connecting pipes arranged to circulate the heating medium backward and forward, the coils being shown as supported in a fixed position in the tank. The heating medium enters a header at one end of a coil, and passes out of the header at the other end, as shown at E⁴, the exit end of each coil leading directly into the jacket. The heating medium is introduced through a suction pipe L, as by means of a steam injector L', and from each of the branches L² through a corresponding cock L³ into the coils. The exhaust from the jacket is by way of branches R and cocks T, as in Fig. 1. I may also modify the air injecting pipes by introducing the air through a pipe H' supported above the tank by any suitable means, from which depend nozzles D' which project down between two of the adjacent pipes of the coils C' and terminate near the bottom of the tank in a long narrow orifice which spreads the air into a sheet as in the form shown in Fig. 1. The air striking the bottom of the tank is deflected along the bottom and up at the sides, as indicated in Fig. 6. The entire system of nozzles D' and the pipe H' may be bodily removed from the tank for cleaning.

Various other modifications will occur to those skilled in the art, all of which will be embraced within my invention. It will be understood therefore that I do not limit myself to the specific arrangement, details or combinations illustrated and described.

In order to illustrate the practical operation of my apparatus I refer to my application No. 22,105, filed June 30, 1900 (Patent No. 668,161, dated February 19, 1901), in which one form of the apparatus is applied to the concentration of milk to produce so-called "condensed" milk. In carrying out such concentration I have been able to use a circulating medium at a temperature from 180° to 200° F., and at the same time to introduce air in such volume as to maintain the milk at a temperature of about 140° F., or even lower, and under such pressure as to overcome the head of liquid in the tank, (usually 3 to 4 feet deep at the beginning of the process) and to enter the liquid in such a powerful blast as to produce the necessary rolling motion of the milk and scouring of the walls. It will be understood however that my apparatus is capable of working under varied conditions as to temperature &c., and that a temperature which would be high for concentrating milk might be low for concentrating other liquids, or vice versa.

What I claim therefore and desire to secure by Letters Patent are the following defined novel features each substantially as described:—

1. In apparatus for concentrating liquids, the combination of a tank for the liquid, a jacket surrounding said tank, a coil within said tank normally horizontal and trunnioned at one end so that it may be turned into a vertical position, and an air pipe extending into the liquid and apertured to introduce air thereinto near the bottom of the tank and in approximately the direction of said bottom, said air pipe being removable, whereby access to the tank, coil, and air pipe for cleaning the same is facilitated.

2. In an apparatus for concentrating liquids, the combination of a tank for the liquid and a series of coils one above the other within said tank, each coil comprising headers E and F, and pipes connected to said headers E and trunnioned in the walls of said tank, and supports in said tank for said headers F in positions to hold said coils substantially horizontal and one above another, each of said trunnioned pipes being offset from the one above.

3. In an apparatus for concentrating liquids, the combination of a tank for the liquid and a coil within said tank, said coil comprising headers E and F and pipes connected to said header E and trunnioned in the walls of said tank, supports in said tank for said header F in positions to hold said coils substantially horizontal and one above another, and an air pipe extending into the liquid and apertured to introduce air thereinto near the bottom of the tank and in approximately the direction of said bottom, said air pipe being removable, whereby access to the tank, coil, and air pipe for cleaning the same is facilitated.

In witness whereof, I have hereunto signed my name in the presence of two subscribing witnesses.

JOSEPH H. CAMPBELL.

Witnesses:
 THOMAS F. WALLACE,
 FRED WHITE.